US009807219B2

United States Patent

(12) United States Patent
Tang et al.

(10) Patent No.: US 9,807,219 B2
(45) Date of Patent: Oct. 31, 2017

(54) METHOD AND TERMINAL FOR EXECUTING USER INSTRUCTIONS

(71) Applicant: Xiaomi Inc., Beijing (CN)

(72) Inventors: Mu Tang, Beijing (CN); Sitai Gao, Beijing (CN); Xibei Zhang, Beijing (CN); Hao Ye, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/572,961

(22) Filed: Dec. 17, 2014

(65) Prior Publication Data

US 2015/0277603 A1 Oct. 1, 2015

Related U.S. Application Data

(63) Continuation of application No. PCT/CN2014/084361, filed on Aug. 14, 2014.

(30) Foreign Application Priority Data

Mar. 28, 2014 (CN) .......................... 2014 1 0130773

(51) Int. Cl.

*H04M 1/72* (2006.01)
*H04M 1/725* (2006.01)
*H04M 1/23* (2006.01)
*H04M 1/67* (2006.01)

(52) U.S. Cl.

CPC ........ *H04M 1/72519* (2013.01); *H04M 1/236* (2013.01); *H04M 1/67* (2013.01)

(58) Field of Classification Search

CPC ....................................................... G06F 3/041
See application file for complete search history.

(56) References Cited

U.S. PATENT DOCUMENTS 8,130,193 B2 3/2012 Flynt et al.
2002/0093536 A1* 7/2002 Hong .................. G06F 3/04817 715/772
2002/0180622 A1* 12/2002 Lui ......................... G06F 9/445 341/22
2006/0092177 A1 5/2006 Blasko
2006/0128437 A1* 6/2006 Kim .................. H04M 1/72563 455/564
2006/0197750 A1 9/2006 Kerr et al.
2006/0221051 A1 10/2006 Flynt et al.
(Continued)

FOREIGN PATENT DOCUMENTS

CN 1841274 A 10/2006
CN 102662432 A 9/2012
(Continued)

OTHER PUBLICATIONS

International Search Report of PCT/CN2014/084361, from the State Intellectual Property Office of China mailed Dec. 31, 2014.
(Continued)

*Primary Examiner* — Ariel Balaoing
(74) *Attorney, Agent, or Firm* — Finnegan, Henderson, Farabow, Garrett & Dunner LLP

(57) ABSTRACT

A method for a terminal to execute user instructions, includes: receiving an instruction inputted by a user; and executing a preset program string according to the received instruction, the preset program string including at least one preset program.

15 Claims, 17 Drawing Sheets

400

Receive Continuous Clicks on Button or Touch Screen, Number of Continuous Clicks Being Greater Than or Equal to Two — S401

Execute Preset Program String According to Number of Continuous Clicks — S402

(56) References Cited

U.S. PATENT DOCUMENTS

| | | | | |
|---|---|---|---|---|
| 2007/0083780 | A1* | 4/2007 | Aoyagi | G06F 1/3203 713/300 |
| 2007/0103454 | A1 | 5/2007 | Elias | |
| 2008/0184173 | A1 | 7/2008 | Sutanto et al. | |
| 2008/0320391 | A1 | 12/2008 | Lemay et al. | |
| 2009/0102809 | A1 | 4/2009 | Mamba et al. | |
| 2009/0144621 | A1* | 6/2009 | Sangster | G06F 3/0383 715/704 |
| 2009/0307679 | A1 | 12/2009 | Lee et al. | |
| 2012/0068935 | A1* | 3/2012 | Mutoh | H04N 1/00411 345/168 |
| 2013/0021236 | A1* | 1/2013 | Bender | G06F 1/1694 345/156 |
| 2013/0024816 | A1* | 1/2013 | Bender | G06F 9/4443 715/835 |
| 2013/0321691 | A1 | 12/2013 | Naito et al. | |
| 2014/0078091 | A1 | 3/2014 | Lu et al. | |

FOREIGN PATENT DOCUMENTS

| | | | |
|---|---|---|---|
| CN | 102866853 | A | 1/2013 |
| CN | 103064605 | A | 4/2013 |
| CN | 103167179 | A | 6/2013 |
| CN | 103197867 | A | 7/2013 |
| CN | 103475807 | A | 12/2013 |
| CN | 103475818 | A | 12/2013 |
| CN | 103513861 | A | 1/2014 |
| CN | 103942047 | A | 7/2014 |
| EP | 2285077 | A2 | 2/2011 |
| JP | 2006-285966 | A | 10/2006 |
| JP | 2013-97800 | A | 5/2013 |
| KR | 10-2011-0028374 | A | 3/2011 |
| KR | 10-2013-0087814 | A | 8/2013 |
| RU | 2363033 | C2 | 7/2007 |
| WO | WO 2013/155937 | A1 | 10/2013 |

OTHER PUBLICATIONS

European Search Report for Application No. 15151319.9, from the European Patent Office, dated Aug. 14, 2015.
English version of International Search Report of PCT/CN2014/084361, mailed from the State Intellectual Property Office of China on Dec. 31, 2014.
Notification of the Results of Examination of Patentability for Russian Application No. 2015130841/08 (047495), dated Oct. 26, 2016.
Communication Pursuant to Article 94(3) EPC in European Patent Application No. 15151319.9, from the European Patent Office, dated Mar. 22, 2017.

* cited by examiner

410

410

Adding

| | |
|---|---|
| Single Click | ● |
| Double Clicks | ●● |
| Triple Clicks | ●●● |
| Four Clicks | ●●●● |
| Five Clicks | ●●●●● |
| Six Clicks | ●●●●●● |
| Seven Clicks | ●●●●●●● |
| Eight Clicks | ●●●●●●●● |
| Nine Clicks | ●●●●●●●●● |
| Ten Clicks | ●●●●●●●●●● |

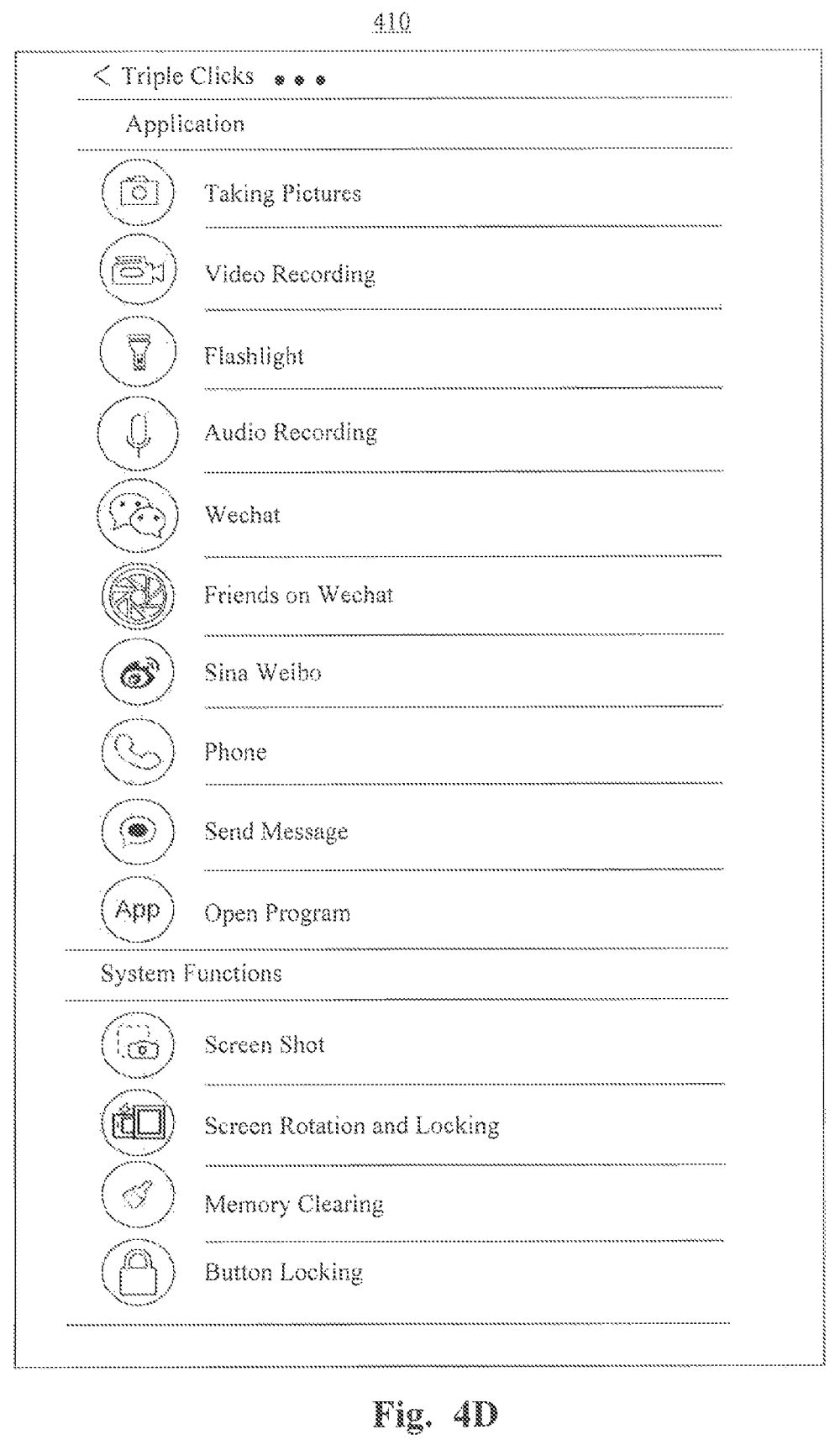

< Triple Clicks • • •

Application

Taking Pictures

Video Recording

Flashlight

Audio Recording

Wechat

Friends on Wechat

Sina Weibo

Phone

Send Message

App Open Program

System Functions

Screen Shot

Screen Rotation and Locking

Memory Clearing

Button Locking

Fig. 4D

METHOD AND TERMINAL FOR EXECUTING USER INSTRUCTIONS

CROSS REFERENCE TO RELATED APPLICATIONS

This application is a Continuation Application of International Application No. PCT/CN2014/084361, filed Aug. 14, 2014, which is based upon and claims priority to Chinese Patent Application No. 201410130773.1, filed Mar. 28, 2014, the entire contents of all of which are incorporated herein by reference.

TECHNICAL FIELD

The present disclosure generally relates to the technical field of a terminal and, more particularly, to a method and a mobile terminal for executing user instructions.

BACKGROUND

A mobile terminal may have a touch screen and a limited number of physical buttons. When not in use, the touch screen of the mobile terminal can be set into a locked state to avoid being unintentionally touched. When in use, the touch screen is unlocked, and the mobile terminal can be controlled through the touch screen.

Since there are only a limited number of physical buttons on the mobile terminal, conventionally, a limited number of functions can be implemented by the physical buttons, and other functions are implemented through the touch screen. Thus, each time a user uses the mobile terminal, the user may need to perform operations to light the screen, unlock the screen, and select applications for executing.

SUMMARY

According to a first aspect of the present disclosure, there is provided a method for a terminal to execute user instructions, comprising: receiving an instruction inputted by a user; and executing a preset program string according to the received instruction, the preset program string including at least one preset program.

According to a second aspect of the present disclosure, there is provided a terminal, comprising: a processor; and a memory configured to store instructions executable by the processor; wherein the processor is configured to: receive an instruction inputted by a user; and execute a preset program string according to the received instruction, the preset program string including at least one preset program.

According to a third aspect of the present disclosure, there is provided a non-transitory computer-readable storage medium having stored therein instructions that, when executed by a processor of a terminal, cause the terminal to perform a method for executing user instructions, the method comprising: receiving an instruction inputted by a user; and executing a preset program string according to the received instruction, the preset program string including at least one preset program.

It is to be understood that both the foregoing general description and the following detailed description are exemplary and explanatory only and are not restrictive of the invention, as claimed.

BRIEF DESCRIPTION OF THE DRAWINGS

The accompanying drawings, which are hereby incorporated in and constitute a part of this specification, illustrate embodiments consistent with the invention and, together with the description, serve to explain the principles of the invention.

FIGS. 4A-4G are schematic diagrams of a display interface on a mobile terminal, according to exemplary embodiments.

DETAILED DESCRIPTION

Figure 1:
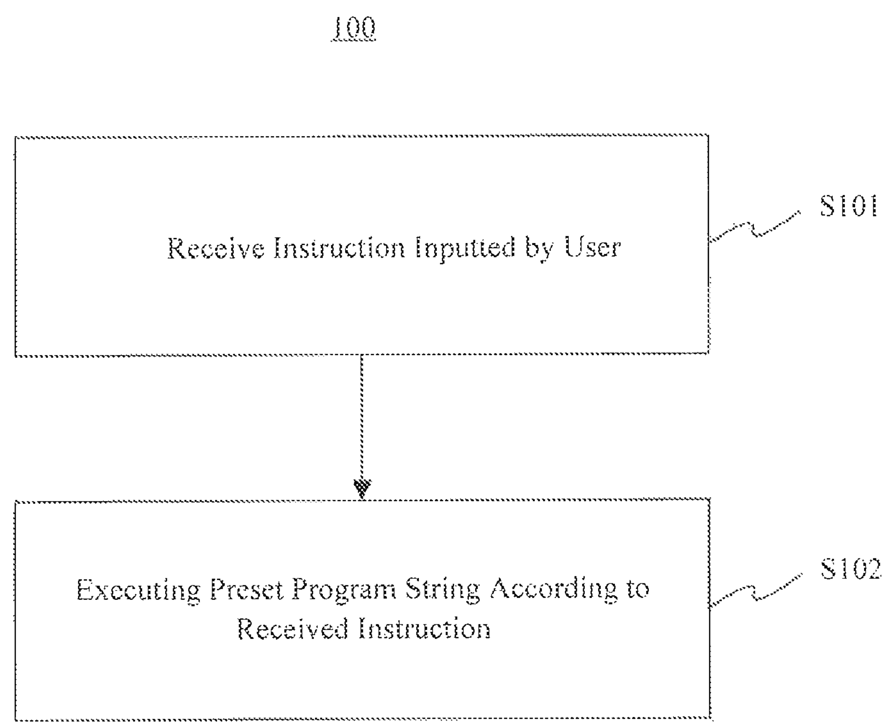
FIG. 1 is a flowchart of a method for executing user instructions, according to an exemplary embodiment.

Reference will now be made in detail to exemplary embodiments, examples of which are illustrated in the accompanying drawings. The following description refers to the accompanying drawings in which the same reference numerals in different drawings represent the same or similar elements unless otherwise stated. The implementations set forth in the following description of exemplary embodiments do not represent all implementations consistent with the disclosure. Instead, they are merely examples of apparatuses and methods consistent with aspects related to the disclosure as recited in the appended claims.

FIG. 1 is a flowchart of a method 100 for a terminal, such as a mobile terminal, to execute user instructions, according to an exemplary embodiment. Referring to FIG. 1, the method 100 includes the following steps.

In step S101, the mobile terminal receives an instruction inputted by a user.

In exemplary embodiments, the mobile terminal may have a touch screen and one or more buttons. The user can input the instruction through the touch screen or a button of the mobile terminal. Accordingly, the instruction inputted by the user is received by the mobile terminal.

Figure 2A:
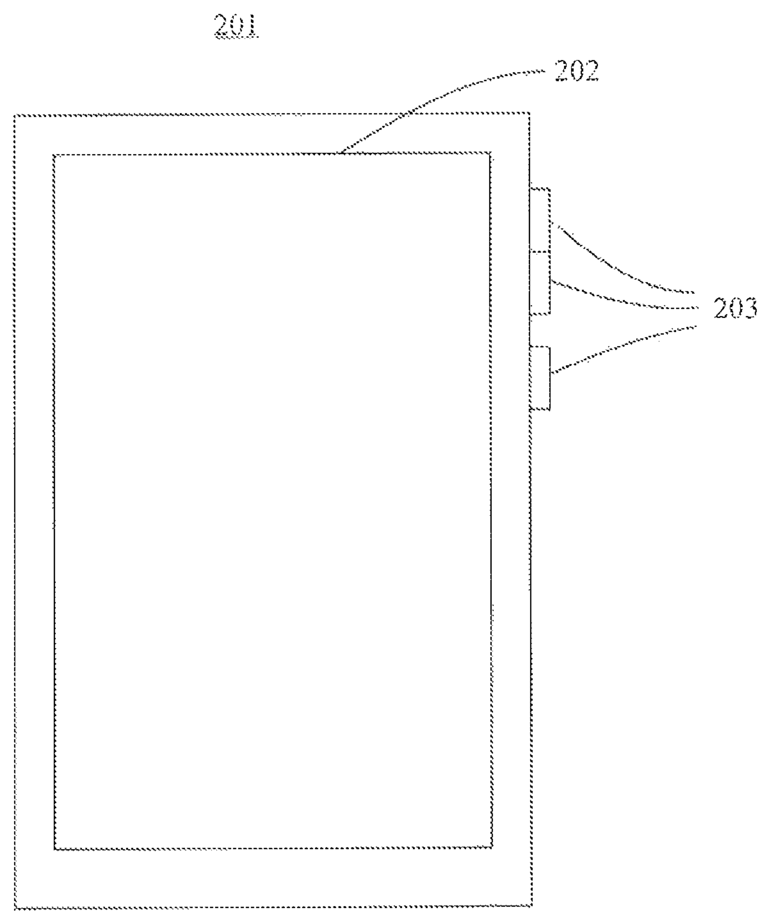
FIG. 2A is a schematic diagram of a mobile terminal, according to an exemplary embodiment.

FIG. 2A is a schematic diagram of a mobile terminal 201, according to an exemplary embodiment. Referring to FIG. 2A, the mobile terminal 201 includes a touch screen 202 and one or more buttons 203. The user can input an instruction through the touch screen 202 or a button 203 of the mobile terminal 201. The instruction can be inputted by the user by, e.g., a single click, a double click, or a long pressing on one of the touch screen 202 or the buttons 203.

Figure 2B:
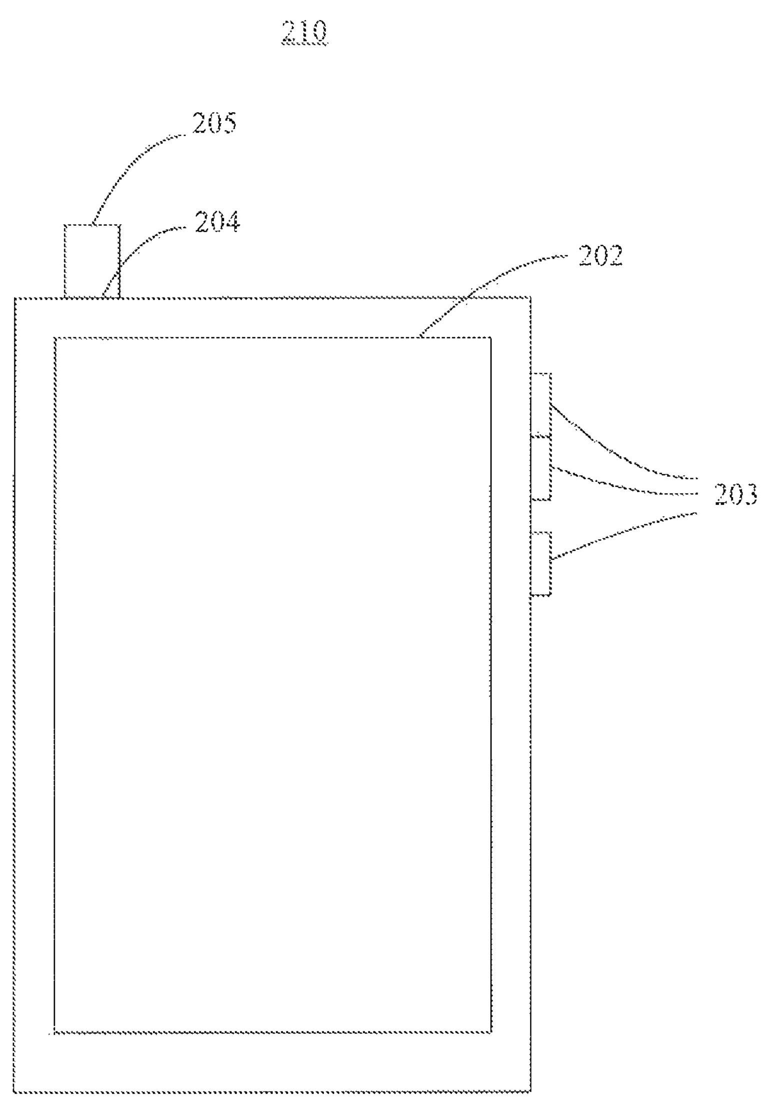
FIG. 2B is a schematic diagram of a mobile terminal, according to an exemplary embodiment.

FIG. 2B is a schematic diagram of a mobile terminal 210, according to another exemplary embodiment. Referring to FIG. 2B, the mobile terminal 210 further includes a headphone jack 204 and a headphone jack button 205 coupled with the headphone jack 204, in addition to the touch screen 202 and the one or more buttons 203. In the illustrated embodiment, the user can input instructions through the headphone jack button 205 by, e.g., a single click, a double click, or a long pressing on the headphone jack button 205.

Figure 3:
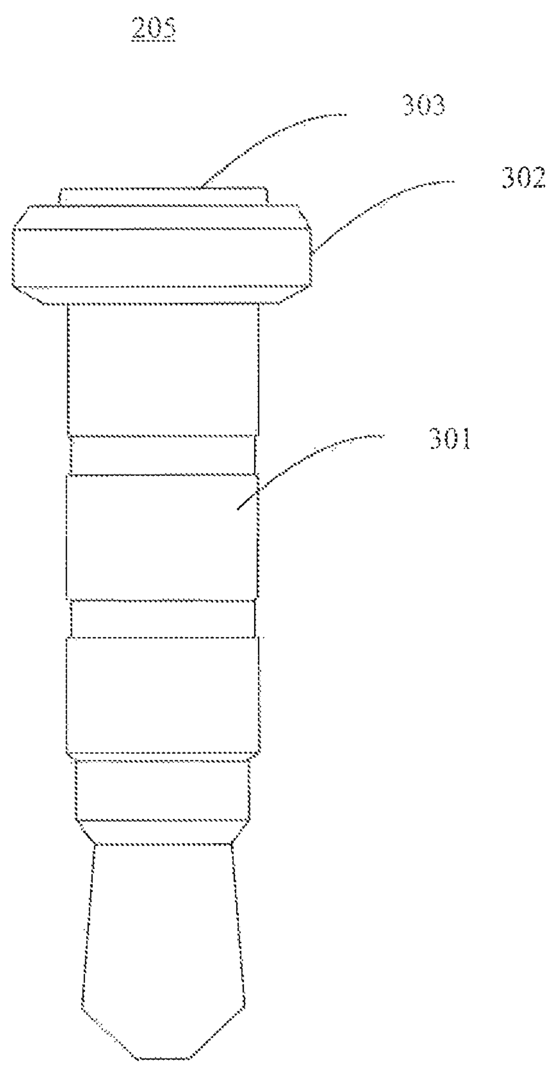
FIG. 3 is a schematic diagram of a headphone jack button, according to an exemplary embodiment.

FIG. 3 is a schematic diagram of the headphone jack button 205 (FIG. 2B), according to an exemplary embodiment. Referring to FIGS. 2B and 3, the headphone jack button 205 includes a plug 301, a body 302, and a button 303. The plug 301 is configured to plug in the headphone jack 204 of the mobile terminal 210. The body 302 is located outside the mobile terminal 210 after the plug 301 is plugged in the headphone jack 204, for the user to input an instruction to the mobile terminal 210 by clicking or pressing the button 303. Accordingly, the instruction inputted by the user through the button 303 is received by the mobile terminal 210.

Referring back to FIG. 1, in step S102, the mobile terminal executes a preset program string according to the received instruction.

In exemplary embodiments, the program string may be preset by the user and include at least one program or at least one function including, for example, applications such as an application for taking pictures, a screenshot application, an audio recording application, a video recording application, a flashlight application, a calling application, a text messaging application, a tweet application, etc., and system functions such as screen locking, screen rotating, memory clearing, etc. A program string may also be generated by combining two or more applications and/or functions, such as combining the calling application and the audio recording application, combining the screenshot application and the tweet application, combining the tweet application and a sharing function for sharing pictures with friends after taking the pictures, etc. The user may set the applications in the program string and an order of the applications for execution.

In exemplary embodiments, after the mobile terminal receives an instruction inputted by the user through a button of the mobile terminal, the mobile terminal executes a program string which is preset by the user and corresponds to the button according to the instruction, so that the program string can be quickly executed.

By using the method 100, the mobile terminal may directly execute the preset program string when the user presses the button without unlocking the screen, which simplifies user operation and improves the operational efficiency.

Figure 4:
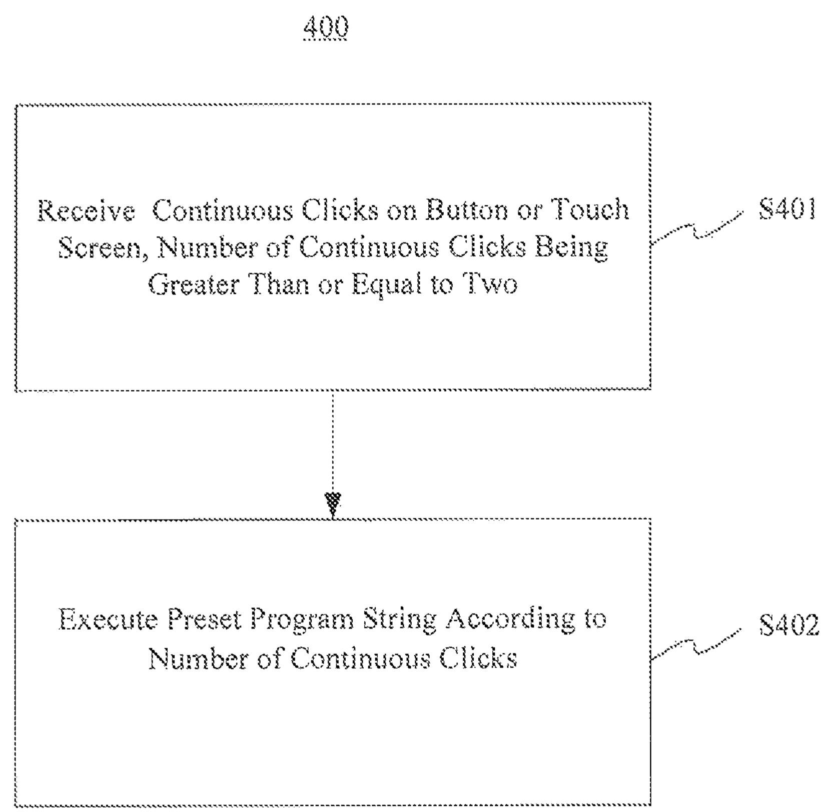
FIG. 4 is a flowchart of a method for executing use instructions, according to an exemplary embodiment.

FIG. 4 is a flowchart of a method 400 for a terminal, such as a mobile terminal, execute user instructions, according to an exemplary embodiment. For example, the mobile terminal includes a touch screen and one or more buttons. Referring, to FIG. 4, the method 400 includes the following steps.

In step S401, the mobile terminal receives an instruction inputted by the user by receiving a plurality of continuous clicks on one of a button or the touch screen, a number of the continuous clicks being greater than or equal to two.

In exemplary embodiments, the instruction inputted by the user can be detected by the mobile terminal, and the number of the continuous clicks is also obtained by the mobile terminal. For example, the number of the continuous clicks may be 2, 3, 4, 10, 100, etc.

In step S402, the mobile terminal executes a preset program string according to the number of the continuous clicks.

In exemplary embodiments, different numbers of continuous clicks may correspond to different program strings. FIGS. 4A-4G are schematic diagrams of a display interface 410 on the mobile terminal, according to exemplary embodiments. In one exemplary embodiment, shown in FIG. 4A, the display interface 410 displays user settings, a single click by the user corresponding to executing a program string for taking pictures; double clicks by the user corresponding to executing a program string to turn on flashlight; and triple clicks by the user corresponding to executing a program string to turn on audio recording. In one exemplary embodiment, shown in FIG. 4B, the display interface 410 further displays a user setting of four clicks by the user corresponding to executing a program string to perform screenshot and then share the screenshot. In one exemplary embodiment, shown in FIG. 4C, the user may click items for different numbers of clicks shown on the display interface 410, and then set different program strings for the different numbers of clicks. In one exemplary embodiment, shown in FIG. 4D, the user may set a program string corresponding to, e.g., triple clicks by selecting one or more applications/functions from a listing of available applications and functions displayed on the display interface 410.

Figure 4A:
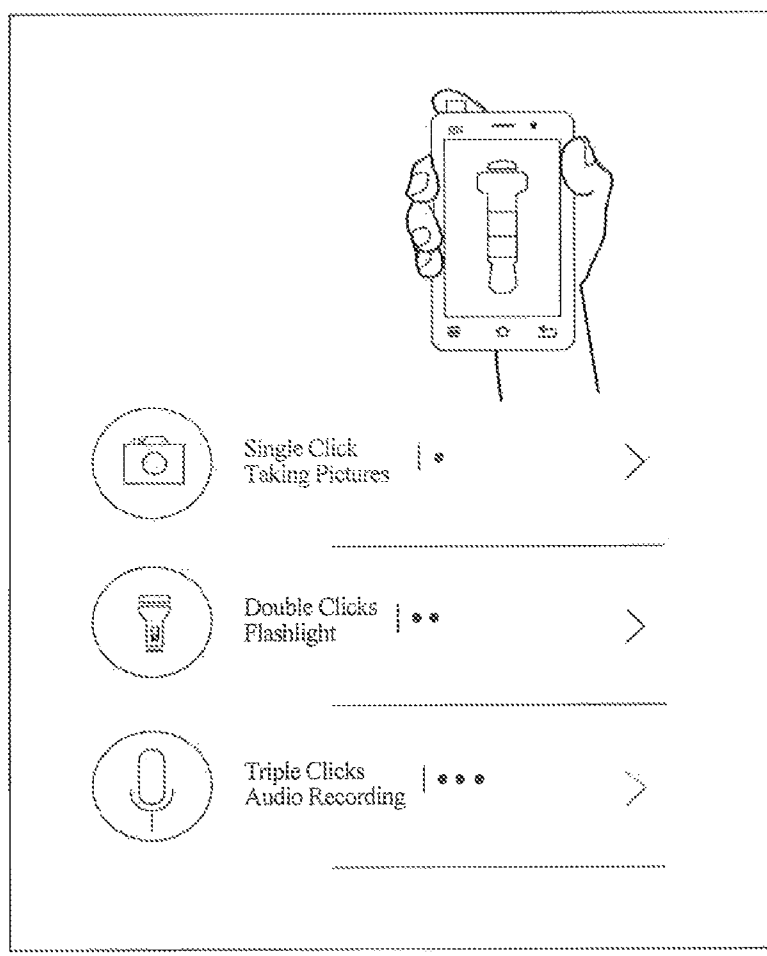
Figure 4B:
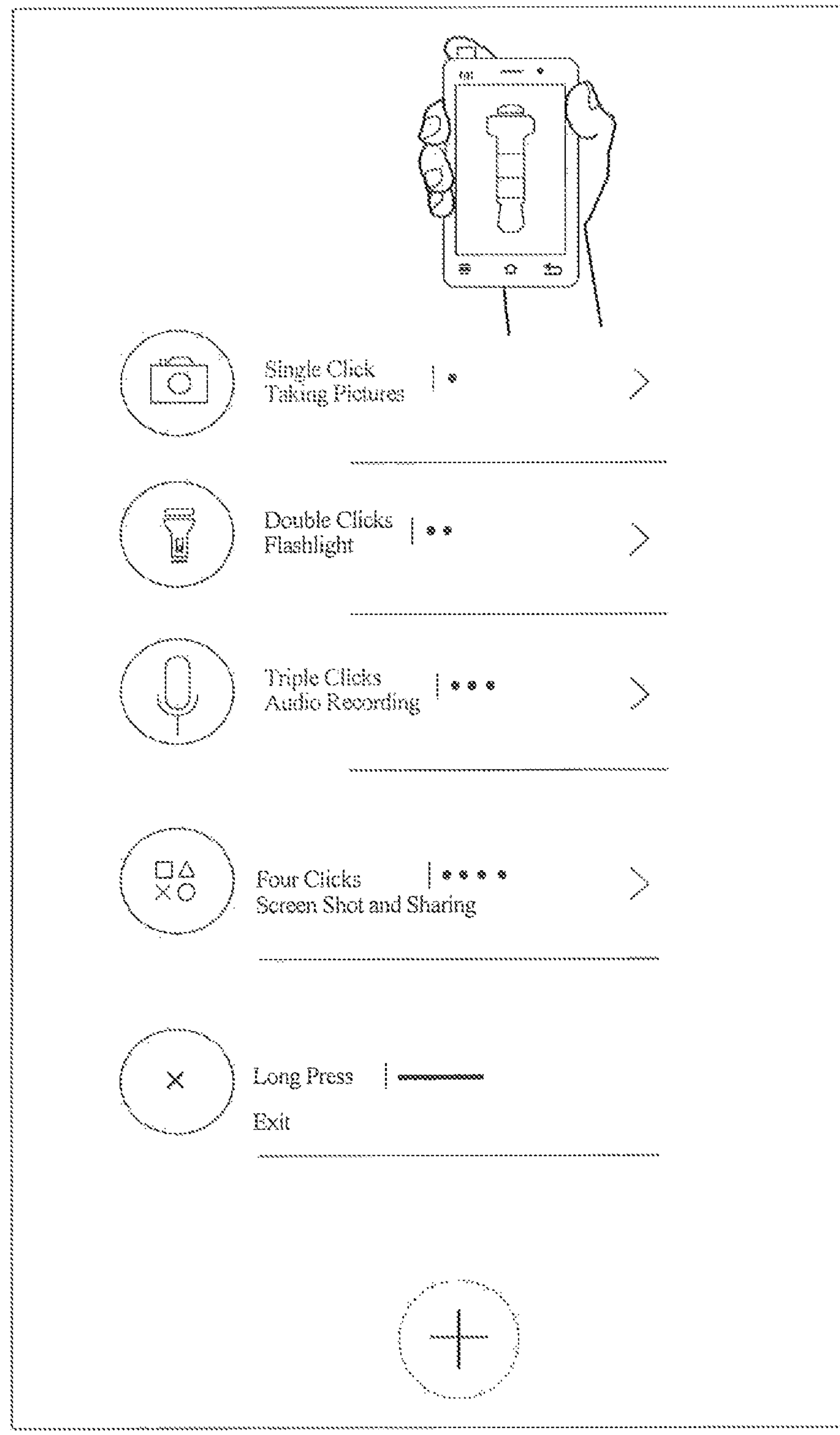
Figure 4E:
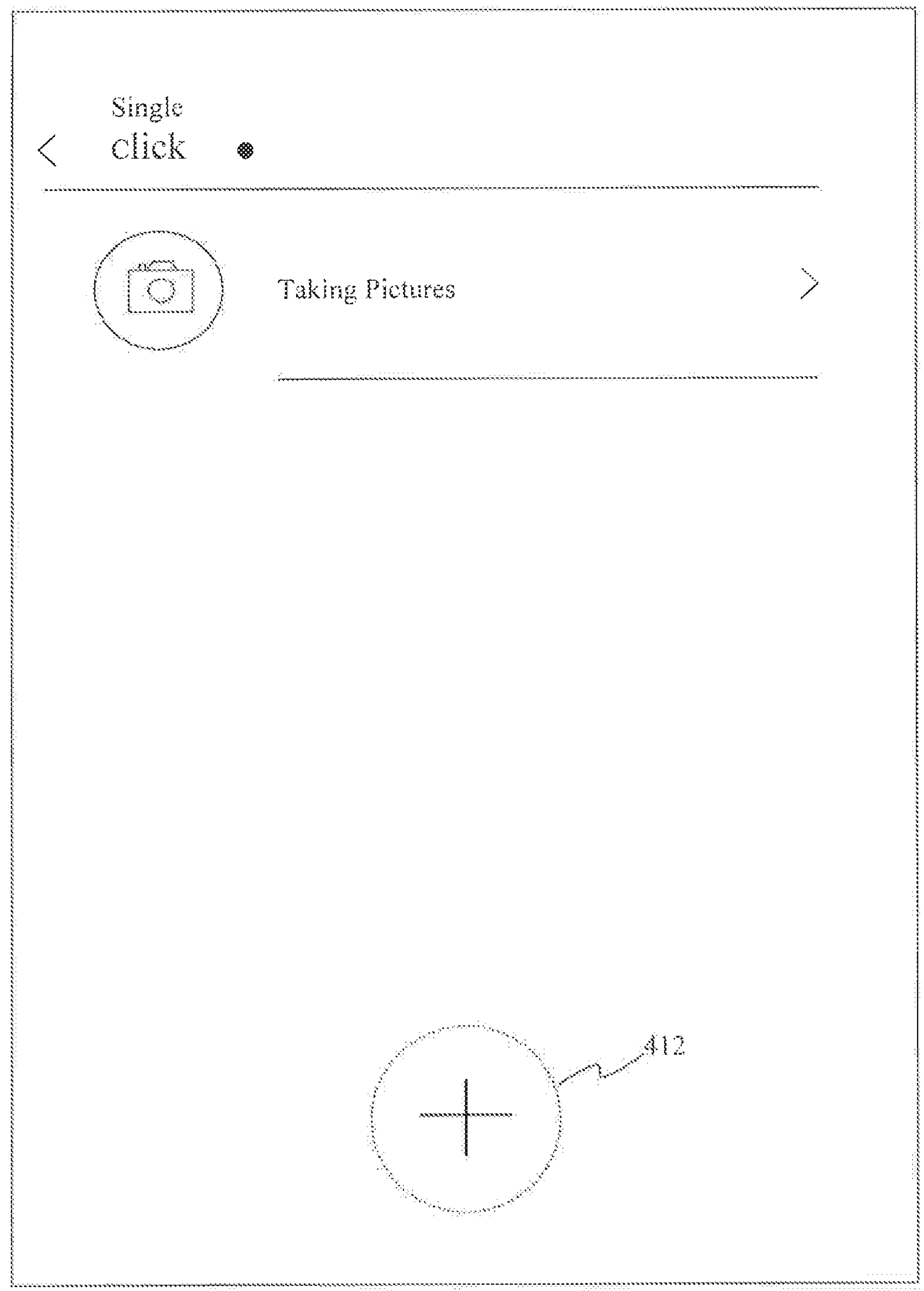
Figure 4F:
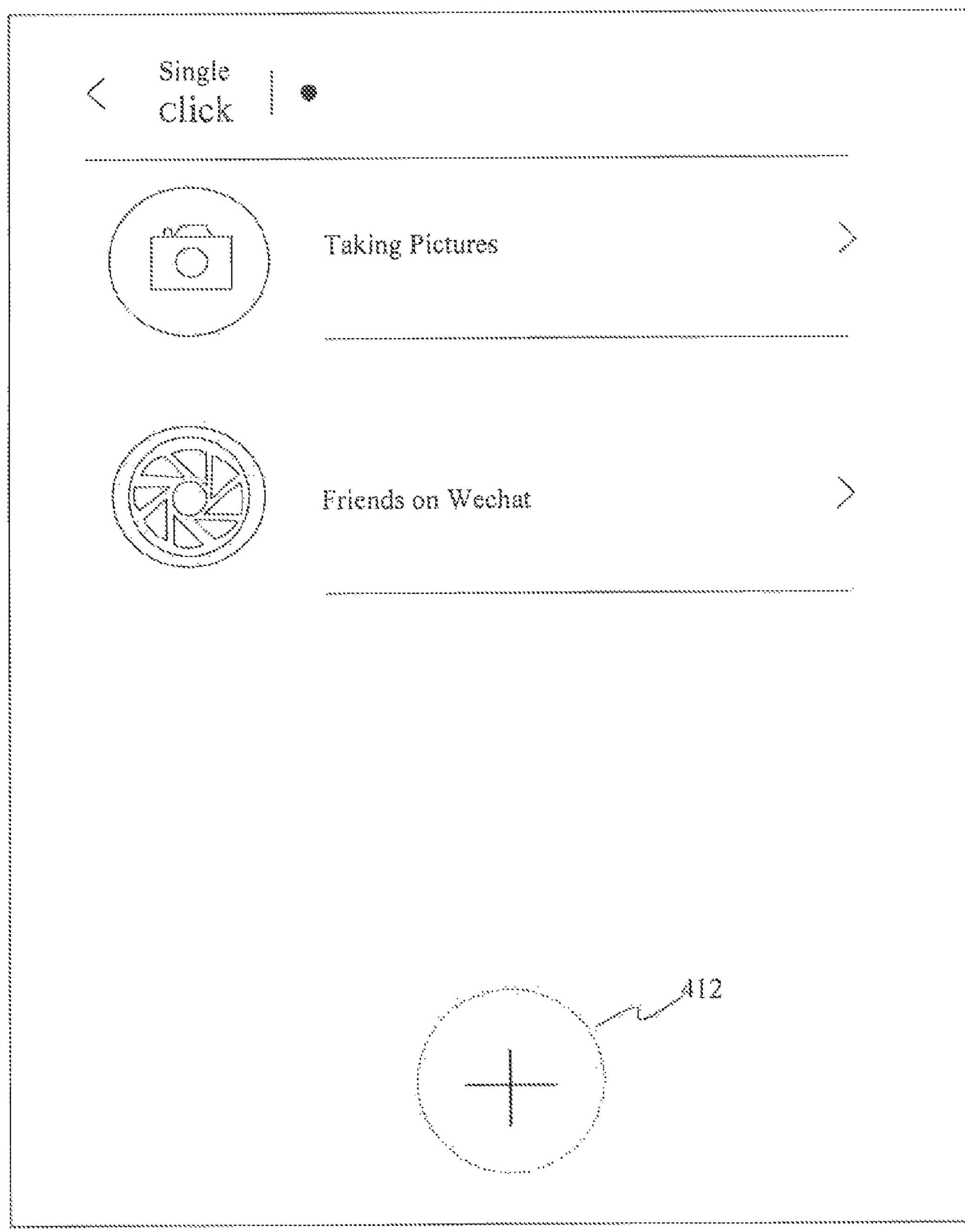
Figure 4G:
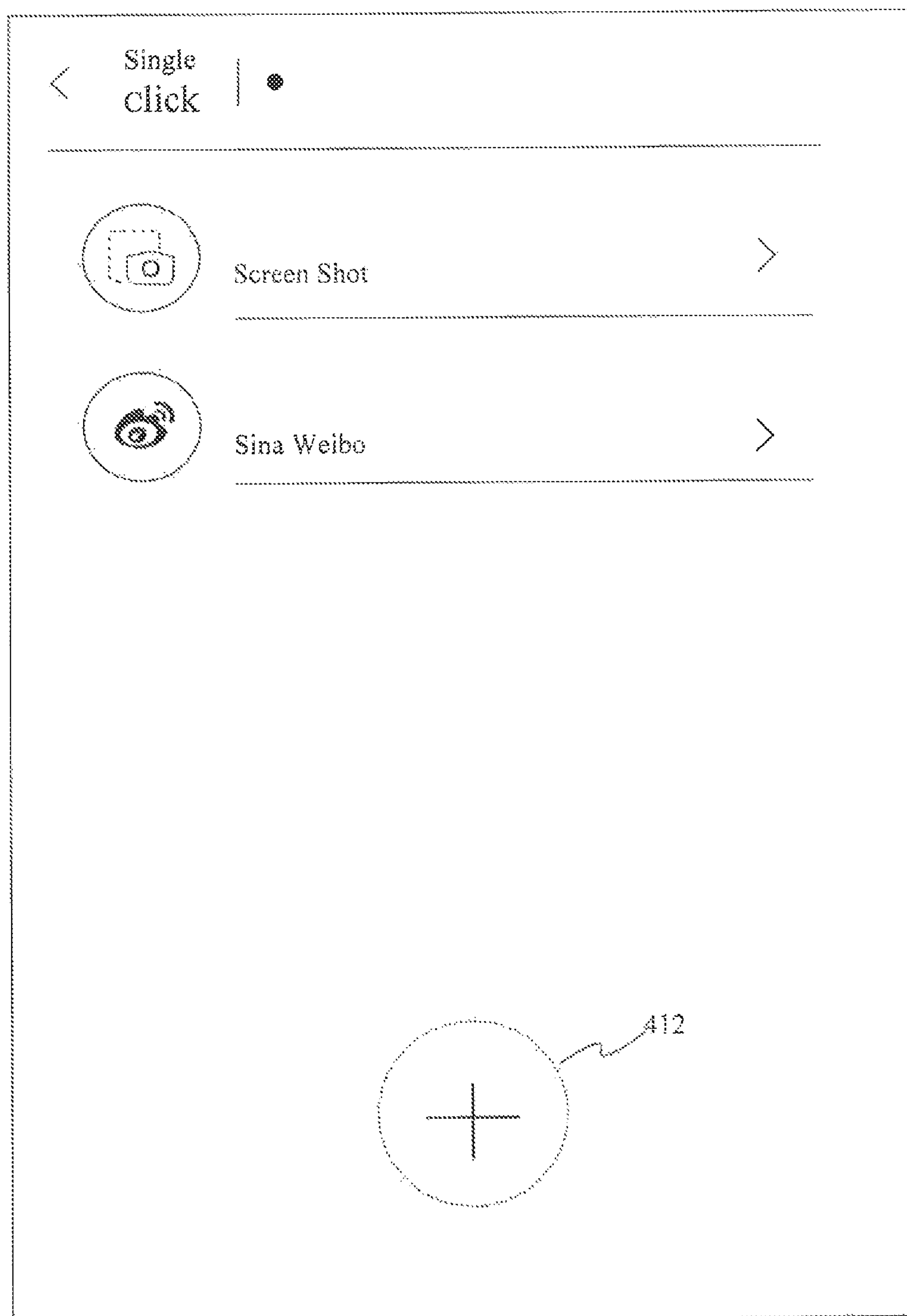

In exemplary embodiments, the user may set the program string corresponding to the single click for one or more applications and/functions when the user clicks an item for the single click in the display interface 410 shown in any of FIGS. 4A-4C. In one exemplary embodiment, shown in FIG. 4E, the program string corresponding to the single click was set to include a first application of taking pictures, and the user may click an adding key 412 at, e.g., the bottom of the display interface 410 to add a second application/function to the program string if e.g., the user needs to further process the captured pictures. In one exemplary embodiment, shown in FIG. 4F, the program string corresponding to the single click is set to include the application of taking pictures and an application of sharing the captured pictures with friends. In one exemplary embodiment, shown in FIG. 4G, the program string corresponding to the single click is set to include the system function of screenshot and the tweet application.

By using the method 400, the user can use a button to perform different functions according to different numbers of continuous clicks, which improves the extensibility of the button and simplify the user's operations.

Figure 5:
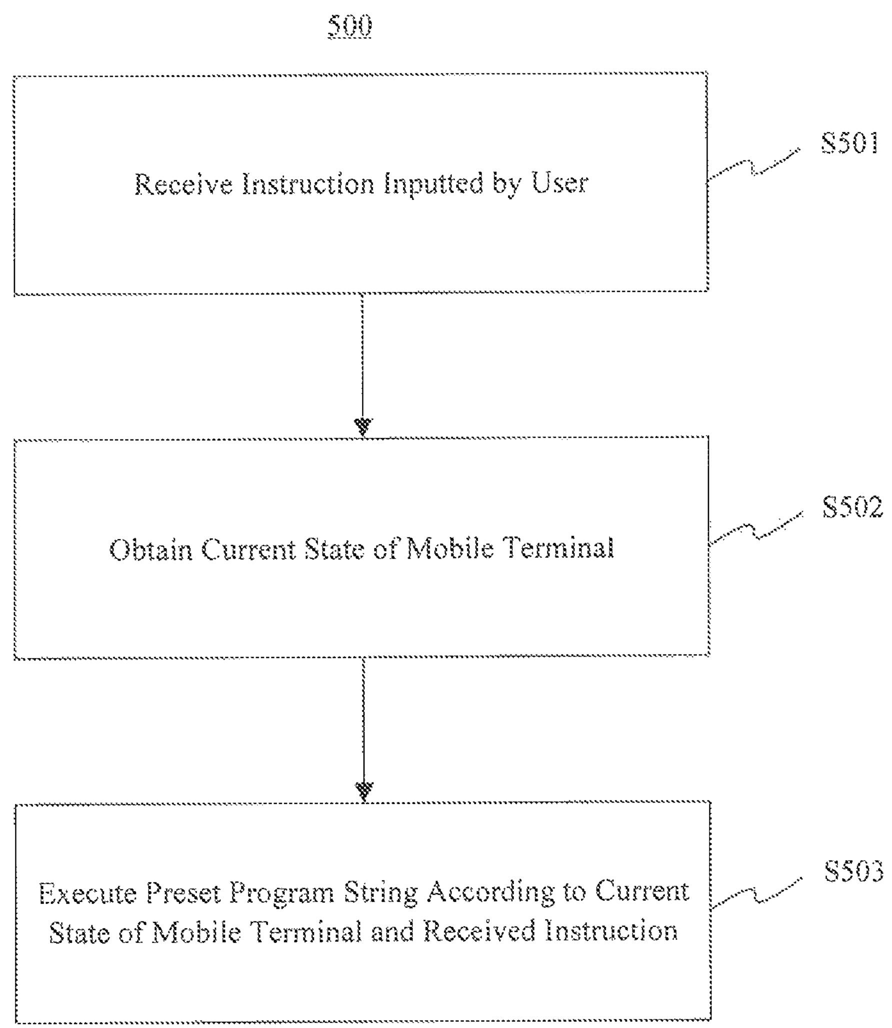
FIG. 5 is a flowchart of a method for executing user instructions, according to an exemplary embodiment.

FIG. 5 is a flowchart of a method 500 for a terminal, such as a mobile terminal, to execute user instructions, according to an exemplary embodiment. For example, the mobile terminal includes a touch screen and one or more buttons. Referring to FIG. 5, the method 500 includes the following steps.

In step S501, the mobile terminal receives an instruction inputted by the user, similar to the above description in connection with step 101 (FIG. 1).

In step 502, the mobile terminal obtains a current state of the mobile terminal. For example, the state of the mobile terminal can be a standby state, a calling state, an audio recording state, etc.

In step S503, the mobile terminal executes a preset program string according to the current state of the mobile terminal and the received instruction.

In the illustrated embodiment, the same input operation by the user may correspond to different program strings under different states of the mobile terminal. For example, the single-click operation by the user may correspond to a program string for taking pictures under the standby state, and correspond to a program string for audio recording under the cab state. Different program strings corresponding to the same input operation under different states can be preset by the user.

By using the method 500, the mobile terminal can match different states of the mobile terminal with different program strings when the user clicks the same button, so that the extensibility of the button is improved and the user's operations are simplified.

Figure 6:
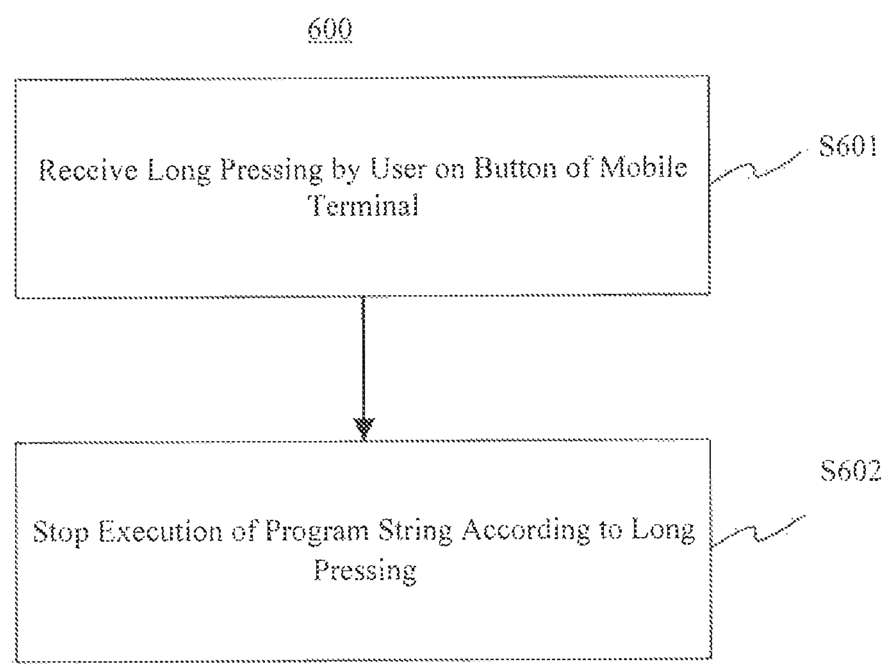
FIG. 6 is a flowchart of a method for executing user instructions, according to an exemplary embodiment.

FIG. 6 is a flowchart of a method 600 for a terminal, such as a mobile terminal, to execute user instructions, according to an exemplary embodiment. For example, the mobile terminal includes a touch screen and one or more buttons. Referring to FIG. 6, the method 600 includes the following steps.

In step S601, the mobile terminal receives a long pressing by the user on a button of the mobile terminal.

In the illustrated embodiment, the mobile terminal detects a long pressing on a button if the button is pressed for longer than 0.5 second or more. The period for the long pressing may be set by the user according to habits, and is not limited in the present disclosure.

In step 602, the mobile terminal stops execution of a program string based on the long pressing.

In one exemplary embodiment, when the mobile terminal receives the long pressing on the button by the user, the mobile terminal stops execution of the current program string and returns to a desktop state or a standby state.

By using the method 600, execution of the current program string may be stopped after the long pressing on the button regardless of a current state of the mobile terminal. Accordingly, the user's operations are simplified and the operational efficiency is improved.

Figure 7A:
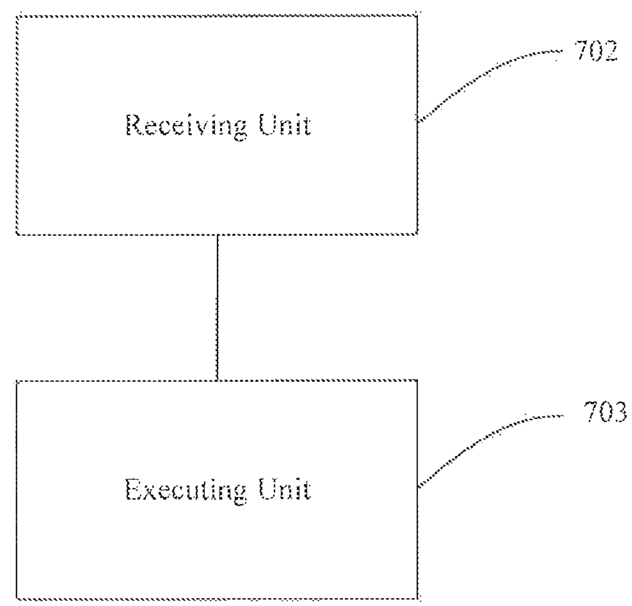
FIG. 7A is a block diagram of an apparatus for executing user instructions, according to an exemplary embodiment.

FIG. 7A is a block diagram of an apparatus 701 for executing user instructions, according to an exemplary embodiment. For example, the apparatus 701 may be used in a terminal. Referring to FIG. 7A, the apparatus 701 includes a receiving unit 702 and an executing unit 703. The receiving unit 702 is configured to receive an instruction inputted by the user. The executing unit 703 is configured to execute a preset program string according to the received instruction.

Figure 7B:
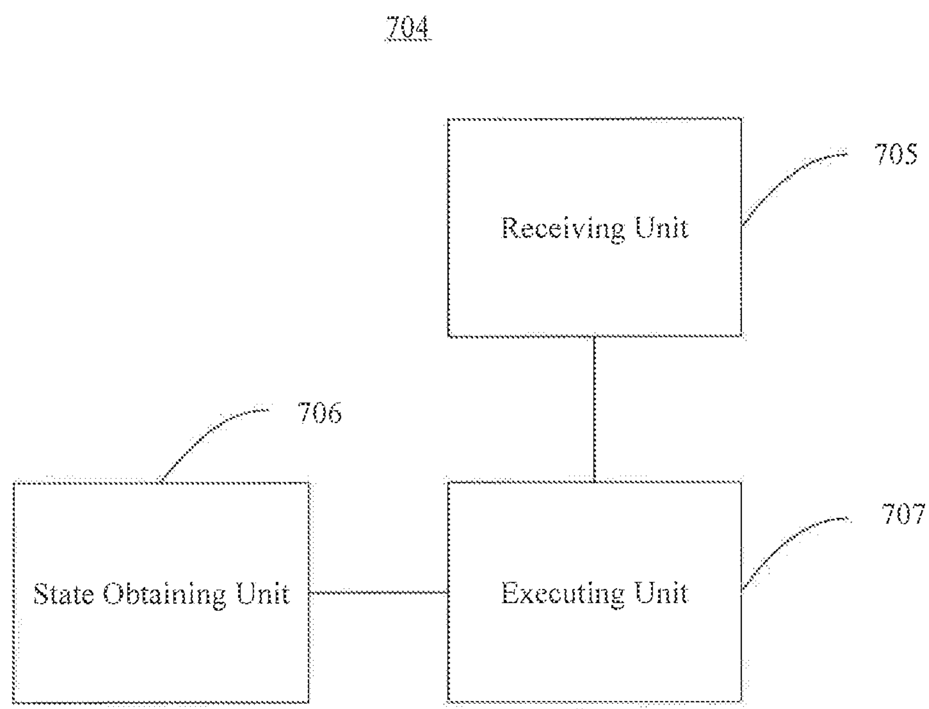
FIG. 7B is a block diagram of an apparatus for executing user instructions, according to an exemplary embodiment.

FIG. 7B is a block diagram of an apparatus 704 for executing user instructions, according to an exemplary embodiment. For example, the apparatus 704 may be used in a terminal. Referring to FIG. 7B, the apparatus 704 includes a receiving unit 705, a state obtaining unit 706, and an executing unit 707.

The receiving unit 705 is configured to receive an instruction inputted by the user. The state obtaining unit 706 is configured to obtain a current state of the terminal. The executing unit 707 is configured to execute a preset program string according to the current state of the terminal and the received instruction.

The specific operation of each of the above units is described in detail in the embodiments of the methods, and will not be repeated herein.

Figure 8:
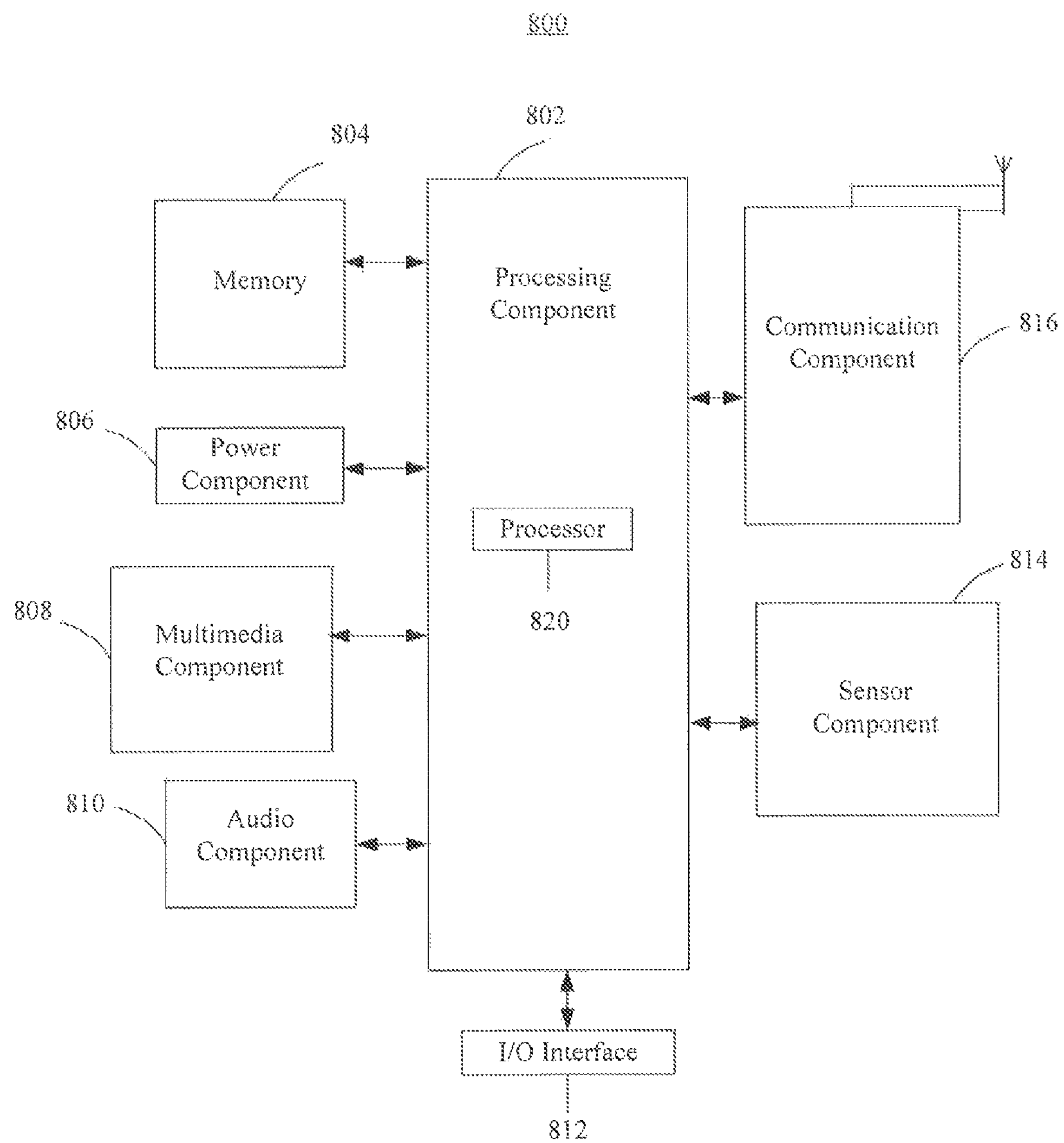
FIG. 8 is a block diagram of a terminal, according to an exemplary embodiment.

FIG. 8 is a block diagram of a terminal 800, according to an exemplary embodiment. For example, the terminal 800 may be a mobile phone, a computer, a digital broadcast terminal, a messaging device, a gaming console, a tablet, a medical device, exercise equipment, a personal digital assistant and the like.

Referring to FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802. The processing component 802 is configured to receive an instruction inputted by a user, and to execute a preset program string according to the inputted instruction.

The memory 804 is configured to store various types of data to support the operation of the terminal 800. Examples of such data include instructions for any application or method operated on the terminal 800, contact data, phonebook data, messages, pictures, videos, etc. The memory 604 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 306 may include a power management system, one or more power sources, and other components associated with the generation, management, and distribution of power in the terminal 800.

The multimedia component 808 includes a screen providing an output interface between the terminal 800 and the user, in some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be farther stored in the memory 804 or transmitted via the communication component 816. In some embodiments, the audio component 810 further includes a speaker to output audio signals.

The I/O interface 812 provides an interface between the processing component 802 and peripheral interface modules, such as a keypad, a click wheel, a button, and the like. The button may include, but not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel, in one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for executing the above described methods.

In exemplary embodiments, there is also provided a non-transitory computer-readable storage medium including instructions, such as included in the memory 804, executable by the processor 820 in the terminal 800, for executing the above-described methods. For example, the non-transitory computer-readable storage medium may be a ROM, a random access memory (RAM), a CD-ROM, a magnetic tape, a floppy disc, an optical data storage device, and the like.

One of ordinary skill in the art will understand that the above described units can each be implemented by hardware, or software, or a combination of hardware and software. One of ordinary skill in the art will also understand that multiple ones of the above described units may be combined as one unit, and each of the above described units may be further divided into a plurality sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof it is intended that the scope of the invention only be limited by the appended claims.

What is claimed is:

1. A method for a terminal to execute user instructions, comprising:

receiving an instruction inputted by a user, wherein the receiving includes receiving a plurality of continuous clicks by the user on a button of the terminal, a number of the continuous clicks being greater than or equal to two;

obtaining a current operating state of the terminal; and executing a preset program string according to the number of the continuous clicks and the current operating state of the terminal, the preset program string including two or more preset programs, wherein different numbers of continuous clicks correspond to different program strings, and the executing includes executing the two or more preset programs in a predetermined order according to the received instruction.

2. The method according to claim 1 further comprising: receiving user input to preset the program string.

3. The method according to claim 1, further comprising:

receiving a long pressing by the user on the button of the terminal; and stopping execution of the program string according to the long pressing.

4. A terminal, comprising:

a processor; and a memory configured to store instructions executable by the processor;

wherein the processor is configured to:

receive an instruction inputted by a user, wherein the receiving includes receiving a plurality of continuous clicks by the user on a button of the terminal, a number of the continuous clicks being greater than or equal to two;

obtain a current operating state of the terminal; and execute a preset program string according to the number of the continuous clicks and the current operating state of the terminal, the preset program string including two or more preset programs, wherein different numbers of continuous clicks correspond to different program strings, and the executing includes executing the two or more preset programs in a predetermined order according to the received instruction.

5. The terminal according to claim 4, wherein the processor is further configured to:

receive user input to preset the program string.

6. The terminal according to claim 4, wherein the processor is further configured to:

receive a long pressing by the user on the button of the terminal; and stop execution of the program string according to the long pressing.

7. A non-transitory computer-readable storage medium having stored therein instructions that, when executed by a processor of a terminal, cause the terminal to perform a method for executing user instructions, the method comprising:

receiving an instruction inputted by a user, wherein the receiving includes receiving a plurality of continuous clicks by the user on a button of the terminal, a number of the continuous clicks being greater than or equal to two;

obtaining a current operating state of the terminal; and executing a preset program string according to the number of the continuous clicks and the current operating state of the terminal, the preset program string including two or more preset programs, wherein different numbers of continuous clicks correspond to different program strings, and the executing includes executing the two or more preset programs in a predetermined order according to the received instruction.

8. The non-transitory computer-readable storage medium according to claim 7, wherein the method further comprises:

receiving user input to preset the program string.

9. The non-transitory computer-readable storage medium according to claim 7, wherein the method further comprises:

receiving a long pressing by the user on the button of the terminal; and stopping execution of the program string according to the long pressing.

10. The method according to claim 1, wherein the current operating state of the terminal includes at least one of a standby state, a calling state, or an audio recording state.

11. The terminal according to claim 4, wherein the current operating state of the terminal includes at least one of a standby state, a calling state, or an audio recording state.

12. The non-transitory computer-readable storage medium according to claim 7, wherein the current operating state of the terminal includes at least one of a standby state, a calling state, or an audio recording state.

13. The method according to claim 1, wherein the executing of the preset program string includes executing the two or more preset programs in an order in which the two or more preset programs are added into the preset program string by the user.

14. The terminal according to claim 4, wherein the processor is further configured to execute the two or more preset programs in an order in which the two or more preset programs are added into the preset program string by the user.

15. The non-transitory computer-readable storage medium according to claim 7, wherein the executing of the preset program string includes executing the two or more preset programs in an order in which the two or more preset programs are added into the preset program string by the user.

* * * * *